Aug. 18, 1953 — V. C. H. RICHARDSON — 2,649,314
QUICK DETACHABLE SWIVEL PIPE UNION
Filed Aug. 7, 1951 — 2 Sheets-Sheet 1
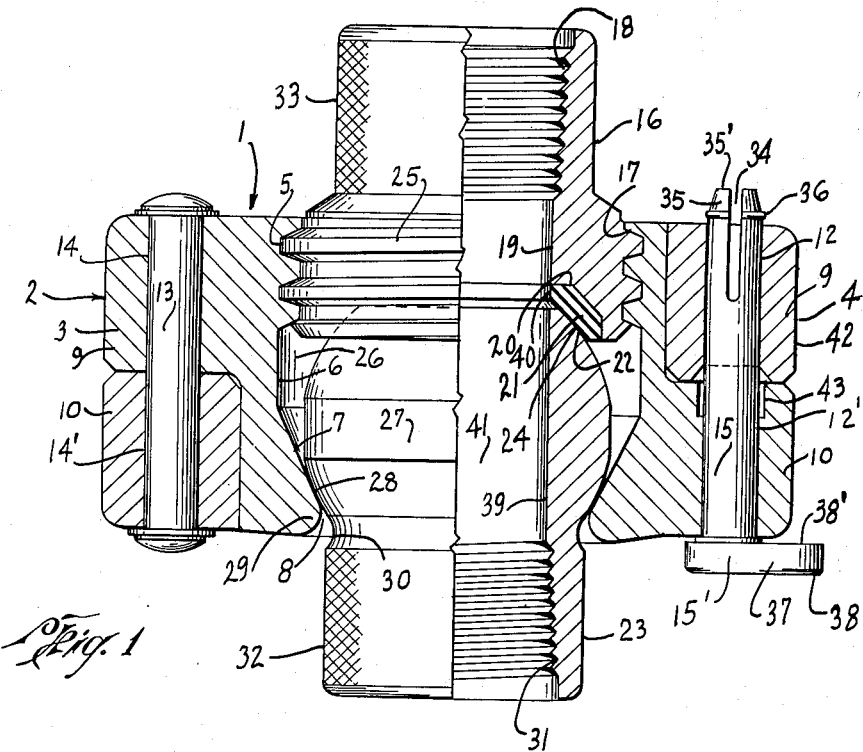
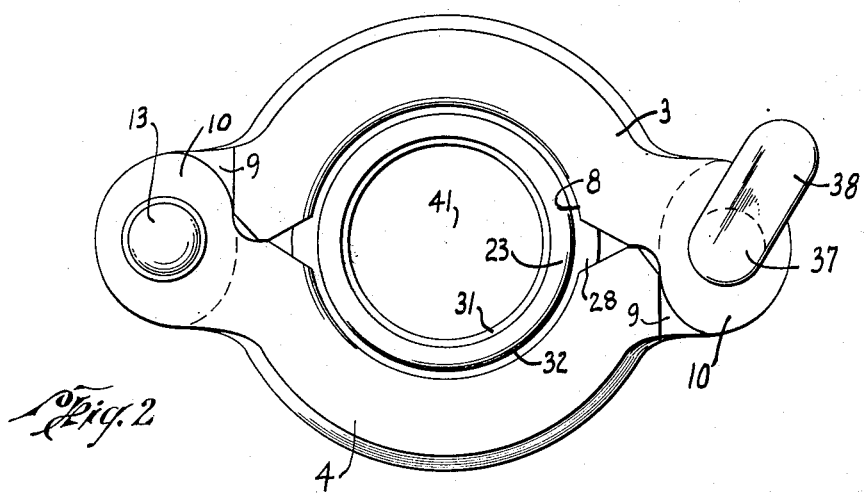
Vernon C. H. Richardson
INVENTOR.
BY Wm. E. Ford &
Jack W. Hayden
ATTORNEY Patented Aug. 18, 1953

2,649,314

UNITED STATES PATENT OFFICE 2,649,314

QUICK DETACHABLE SWIVEL PIPE UNION

Vernon C. H. Richardson, Bellaire, Tex., assignor of one-fourth to Cecil K. Farr, Beaumont, Tex., and one-fourth to Floyd W. Etchison and one-fourth to John H. Stevenson, both of Port Arthur, Tex.

Application August 7, 1951, Serial No. 240,637

1 Claim. (Cl. 285—91)

This invention relates to a union which is adapted to quickly connect and disconnect two tubular elements; such elements being connected by the union in a manner to permit relative non-axial alignment therebetween.

It is an object of this invention to provide a union which is adapted for rapid connection and disconnection to two tubular elements to be connected.

It is a further object of this invention to provide a union of this class which has two nut sections capable of assembly to complete an internally threaded portion and an internally tapered or seating surface portion.

It is also an object of this invention to provide a union of this class which has a female element engageable with the threaded nut portion, and adapted to provide a sealed seat to be engaged by the arcuate surfaced male member.

It is a further object of this invention to provide a union of this class which has a male member adapted to seat in assembly on a tapered seating surface in the nut sections, thereby providing flexibility and non-axial alignment between the tubular elements to be connected, as the male member also bears with arcuate contact on a seal means provided by the female member.

It is a further object of this invention to provide a union of this class which has a nut assembly comprised of two identically constructed nut sections capable of being pivotally joined along an axis parallel to the axis of the union on one side thereof, and on the opposite side thereof, capable of being rapidly locked in assembled position to match the threaded and tapered portions of each section.

It is also an object of this invention to provide a union of this class in which the thread engagement and seating surface contact the female and male members, respectively, wherein the nut section assembly is protected from the fluid flowing through the bore.

It is yet a further object of this invention to provide a union of this class which has a locking pin easily positioned to connect the nut sections, and which locking pin can be easily retracted from one section to unlock the sections and to position the locking end in a protected position in the other section.

Other and further objects will be apparent when the specification is considered in connection with the drawings in which:

Fig. 1 is a sectional view of the union;

Fig. 2 is a bottom view of the union;

Figure 3:
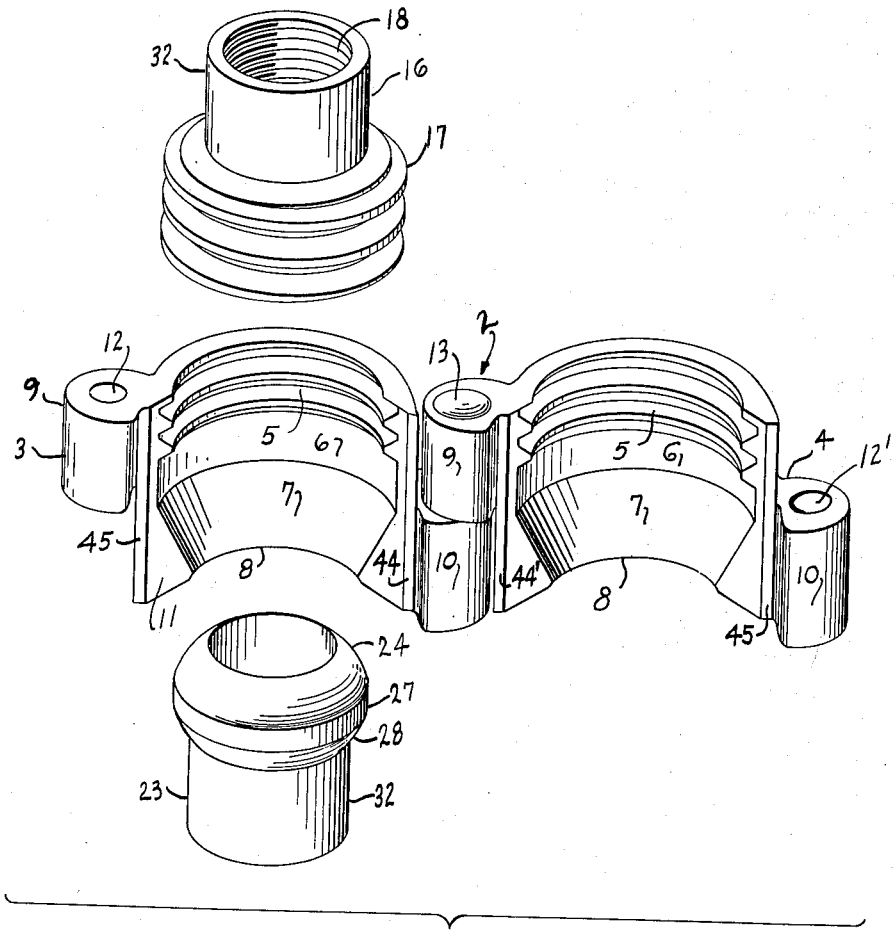
Fig. 3 is a development view showing in perspective the component parts of the union before assembly.

As shown in Fig. 1, the nut assembly 2 of the union I comprises the nut section 3 and the nut section 4. In assembly these sections have been machined together and then split as can be seen most clearly in perspective Fig. 3.

Each nut section has in successive axial alignment an internally threaded portion 5 at one end thereof; adjacent thereto a cylindrically bored section 6; and at the other end thereof an internally tapered portion 7 with the small diameter 8 of the taper outwardly. Radially outwardly from the internally threaded section 5 there is provided on one side of each nut section the lug 9 and on the other side thereof and radially outwardly from the tapered portion 7 is provided the lug 10.

When the nut sections 3 and 4 are fitted together, the split surfaces 11 thereof match so that the internally threaded portions 5 together complete a continuously threaded section. The provision of bores 12 and 12' on one side through the lugs, and the bores 14 and 14' through the lugs on the other side make it possible to complete the assembly of the two nut sections. This can be accomplished by inserting a rivet 13 through the bores 14 and 14' to form a permanent pivotal connection member for the sections, and by providing a locking pin 15 to be inserted through the bores 12 and 12'. This pin can be provided to be easily removable, but when inserted, has means thereon to provide against the pin slipping out through vibration and other normally displacing forces.

The female member 16 comprises one of the flow path connecting members and has the externally threaded area 17 thereon for engagement with the internal threads 5 of the nut sections. This member 16 is also shown as having in one end the internally threaded portion 18 for connection to one of the two tubular members, not shown, which the union connects. Inwardly of the internally threaded section 18 the female section 16 has the bore 19, and in the other end opposite the internally threaded end, there is the counterbored and countersunk portion 20 which provides the receiving surface for the seal means 21. The seating surface 22 of this seal means is beveled or arcuate and will be hereinafter described.

The male member 23 has the arcuate or beveled surface portion 24 thereon to fit against the sealing surface 22. Axially adjacent to the portion 24, the male member 23 may have thereon the substantially cylindrical portion 27. Outwardly on the male member 23 from this cylindrical portion 27, there is provided the arcuate portion 28 to fit the tapered portion 7 of the nut section assembly. The free space 26 is thus left between the male member 23 and the nut sections 3 and 4 to accommodate pivotal movement of the male member as its axis extends at various angles to the axis of the female member. Outwardly of the diameter 8, the nut section assembly may be chamfered at 29 and the female member 23 may be relieved at 30 to more easily accommodate this angular, and non-axial alignment. The male members 23 may terminate outwardly in an internally threaded end portion 31 for connection to a tubular member. A knurled surface 32 may be provided so that a wrench may be applied thereto, and also such a knurled surface 33 may be provided on the female member 16.

The pin 15, shown in Fig. 1, has the slot 34 in the end 35 thereof, and optionally this end may also be bored. Additionally, this end 35 has the bead 36 thereon spaced from the end face 35'. The bead 36 is normally of larger diameter than the bores 12 and 12' but can be forced through these bores by virtue of the fact that the slot (or the slot and counterbore), will permit the end 35 to be radially contracted. Then after the pin 15 is fully inserted, the bead 36 clears the lug 9 and the resiliency of the metal of the pin snaps the end 35 radially outwardly so that the bead 36 locks the pin in position until a radially contracting force can be applied thereagainst.

The head 37 of the pin 15, as shown in Figs. 1 and 2, provides the radially extending arm 38 thereon to serve as a handle or lever to be driven against by contact with the surface 38' to move the pin 15 axially. The countersink 42 is provided to guide the end 35 into the section 9 when the pin is inserted, and the counterbore 43 is provided of a depth greater than the distance from the bead 36 to the end face 35', to receive the end 35 in protected position when the pin 15 is withdrawn.

It is noticeable that the bore 19 through the female member 16 is substantially the same diameter as the bore 39 through the male member 23, and also it is noticeable that the inner diameter 40 of the seal 21 is of substantially the diameter of these bores. Thus there is an uninterrupted flow passage 41 of substantially uniform diameter through the union from the tubular element to be connected on one side thereof to the tubular element to be connected on the other side thereof.

The seal or sealing means or portion 21 can be of rubber, soft lead, or of any other suitable compressible material and it can also be metallic, and of the same material, in certain cases, as the female member 16, and thus an integral part thereof. With this type of union it is possible to connect two tubular elements which are not necessarily desired to be, or which do not necessarily have to be, in axial alignment as hereinabove described. This is possible since the surface 24 of the female member 23 bears upon in sealing contact with the surface 22 of the portion 21 over an extent or length of surface so that the male member 23 may be rotated at an angle limited by the groove 30 therein and by the outwardly arcuate extending surface 29 of the nut section assembly.

When the connecting member between the lugs on one side is a rivet, as the rivet 13, to maintain the nut sections assembled, and when the other connecting member is a lock pin, as the lock pin 15, which is easily insertable in the lug bores, it can be seen how a union of this kind may be quickly assembled or disassembled, and, when assembled, how the male and female members may be locked rapidly together. Also, since the axes of the pin 15, rivet 13, female member 16, and nut sections 9 and 10 must always extend parallel to each other, strains and stresses on such members are minimized.

It can also be seen how the seal 24 protects the threads 5 and 17 against contact with fluid which may flow through the flow passage 41.

It can be seen that a union of this construction can be disassembled with ease, even when corrosion of parts may have occurred since the locking pin 15 can be removed by hammering on the head surface 38' without damaging the parts of the union, and then it is only necessary to break contact between the axially extending section surfaces 44 and 44', and 45 and 45', and pivot the nut sections 9 and 10 about the pivot pin or rivet 13.

As the rivet 13 and locking pin 15 can take radial thrust throughout the length thereof, and as the faces 44 and 44', and 45 and 45' can absorb axial thrust over the full spread of their surface contact, it is not necessary to make a union of this type in a multiple of sizes, dependent upon the pressures encountered, but rather such fitting need only be made to one set of dimensions. In this regard, for excessive pressure usages, this same size union as for lower pressure usages can be strengthened by heat treating.

Broadly, this invention relates to a union which is easily assembled and disassembled and which permits rapid connection and disconnection of two tubular members, and which permits such tubular members to extend in non-axial alignment when desired.

What is claimed is:

In a union having a pair of pipe joint elements for connection in end to end relation, a retaining ring embracing said elements to hold them in assembled relation, said ring comprising a pair of semi-circular sections hinged together and having lugs at their free ends to be overlapped and joined, each lug providing an aperture therein and said apertures being brought into end to end alignment when said ring embraces said elements in assembled relation, a slidable connector pin carried in the aperture of one of said lugs for sliding projection and retraction in said aperture and through the aperture in the other lug, a bead of slightly larger diameter than said pin being provided adjacent one end thereof and said pin being tapered inwardly from said bead to said end and said end being axially split to enable its contraction for reducing the diameter of said bead to the diameter of said apertures for passage therethrough, a head extending radially outwardly from the other end of said pin to provide a surface to be struck to move said pin in an axial direction, said pin being of a length so that with the pin in projected position the inner side of said bead and the inner side of said head are outwardly of the outer faces of said lugs, there being a recess provided in the inner face of the lug nearest said head of a depth greater than the distance from the inner side of said head to the split end of said pin.

VERNON C. H. RICHARDSON.

References Cited in the file of this patent
UNITED STATES PATENTS

| Number | Name | Date |
|---|---|---|
| 793,209 | Miller | June 27, 1905 |
| 885,256 | Jones | Apr. 21, 1908 |
| 2,013,293 | Snell | Sept. 3, 1935 |
| 2,362,454 | Damsel | Nov. 14, 1949 |